(12) United States Patent
Chu et al.

(10) Patent No.: US 7,693,168 B2
(45) Date of Patent: Apr. 6, 2010

(54) APPARATUS FOR DECOMPOSING AN AUTOMATIC CROSS CONNECT SYSTEM AT A REMOTE WIRING HUB

(75) Inventors: Thomas P. Chu, Englishtown, NJ (US); Paul Francis Gagen, Califon, NJ (US); Francis Robert Magee, Lincroft, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1287 days.

(21) Appl. No.: 10/954,965

(22) Filed: Sep. 30, 2004

(65) Prior Publication Data

US 2006/0067523 A1    Mar. 30, 2006

(51) Int. Cl.
*H04L 12/28*    (2006.01)
(52) U.S. Cl. .................. 370/420; 370/401; 375/222
(58) Field of Classification Search ............. 370/420, 370/421, 422, 252, 352, 401; 375/222
See application file for complete search history.

(56) References Cited

U.S. PATENT DOCUMENTS

| 6,754,329 | B2 * | 6/2004 | Teixeira ............... 379/221.02 |
| 6,977,922 | B2 * | 12/2005 | Blanset et al. ............. 370/352 |
| 2002/0101851 | A1 * | 8/2002 | Blake et al. ................ 370/352 |
| 2002/0101973 | A1 | 8/2002 | Teixeira |
| 2003/0142811 | A1 * | 7/2003 | Teixeira .................... 379/327 |
| 2004/0095956 | A1 * | 5/2004 | Henderson et al. .......... 370/463 |
| 2004/0208572 | A1 * | 10/2004 | Schemmann et al. ......... 398/82 |
| 2005/0074021 | A1 * | 4/2005 | Bossemeyer et al. ........ 370/420 |
| 2006/0023740 | A1 * | 2/2006 | Ross et al. ................. 370/463 |

FOREIGN PATENT DOCUMENTS

| EP | 05 25 5878 | 12/2005 |
| WO | WO 00/65780 A | 11/2000 |
| WO | WO 02/062079 A | 8/2002 |

* cited by examiner

*Primary Examiner*—Ricky Ngo
*Assistant Examiner*—Gary Mui
(74) *Attorney, Agent, or Firm*—Wall & Tong, LLP

(57) ABSTRACT

Apparatus for providing connectivity at a hub having a plurality of subscriber lines and a plurality of feeder lines. The apparatus includes a first switch module for coupling to N of the plurality of subscriber lines, where N is an integer. The first switch module is also for coupling to a digital subscriber line access modem (DSLAM) at the hub. A second switch module is coupled to the first switch module and the DSLAM. The second switch module is also adapted for coupling to M of the plurality of feeder lines at the hub, where M is an integer.

11 Claims, 12 Drawing Sheets

APPARATUS FOR DECOMPOSING AN AUTOMATIC CROSS CONNECT SYSTEM AT A REMOTE WIRING HUB

FIELD OF INVENTION

The present invention relates to providing connectivity for telephony services at a remote hub. More specifically, the invention relates to design and implementation of an analog cross-connect switch deployed between subscriber lines and feeder lines at a remote hub.

BACKGROUND OF INVENTION

Telephony service providers of telephony (e.g., POTS and DSL) services utilize outside plants that provide connectivity from the subscribers of the service to the central offices (CO) of the service provider. The most common media used in the outside plant is copper loops. A copper loop typically transverses from the CO to the subscriber homes via manholes, wiring cabinets, pedestals, and poles before terminating at the network interface device (NID) at the subscribers' premises.

The manholes and cabinets represent major concentration sites for the wiring. Each cabinet or manhole (i.e., remote hub) typically serves about 500 homes. Each home is wired with approximately 3 to 5 pairs of coppers wires, depending on the practices of the service provider. Thus, about 1500 to 2500 subscriber-lines may terminate at such a remote hub. However, it is unlikely that all the subscriber lines are active. Accordingly, for cost and practical reasons, fewer amounts of wires (i.e., feeder lines) are laid between the remote hub and the central office.

A conventional remote hub includes two frames, one of which terminates a plurality of subscriber lines from the homes (subscriber premises), and the other frame terminates a plurality of feeder lines from a central office. Wiring connections between the two frames are made to provide end-to-end connectivity from the subscribers to the central office, and thereby provide conventional telephone services. In the current practice, such wire connections is performed manually by dispatching field personnel to the hub.

In addition to conventional telephone service, the service providers are currently implementing digital subscriber line (DSL) access as a means to provide broadband access (e.g., video and data) to the subscribers. In order to achieve a maximum rate, DSL service providers increasing deploy digital subscriber line access modems (DSLAMs) at the remote hubs, thereby decreasing the distance of the copper loop to the subscriber premises and increasing the speed of the DSL services. However, the broadband access market is very competitive with many service providers vying for the same market with a variety of the technologies (e.g., DSL, cable, fiber, etc.). This competitive market has resulted in a high subscriber churn (i.e., turnover) rate for such broadband services. Every "churn" of the DSL service typically entails the dispatch of a field technician to re-wire the connections at the remote hub. Dispatches are both costly and time consuming, and service provider would like to reduce these dispatches as much as possible. One method is to deploy an automatic cross-connect (AXC) system that switches analog signals at these hubs. Such AXCs can be controlled remotely by a technician at the network operations center.

In switching the analog signal, the connection through the cross-connect must be able to carry a fair amount of current (e.g., 250-300 milliamps). Further, the connectivity configuration must be maintained at the remote hub in the event of a power failure, thereby ensuring emergency service calls (e.g., 911 calls).

One prior art technique in building analog cross-connects that satisfy the above two requirements is to use electromechanical relay system, such as micro-electro-mechanical systems (MEMS). The current MEMS technology allows implementation of approximately fifty (50) double-posts single throw relays in an 80 pin chip. Each MEMS chip has a size of approximately $¾"\times¾"$, Such that a conventional $11"\times18"$ board of an automatic cross-connect switch (AXC) can accommodate approximately 150 of these chips, plus control and inter-connecting circuitry.

Even with the MEMS technology, cost and space is still major a consideration in the deployment of AXCs at remote hubs. Service providers still face the problem of whether to deploy a larger system, which provides more coverage but at higher costs, or a smaller systems that would be less costly but provide less coverage. Given these considerations, it is highly desirable to reduce the number of cross-points, and hence the number of MEMS cross-connect chips of the AXC, which would reduce both the cost and space requirement of the AXC switch.

SUMMARY OF THE INVENTION

Accordingly, we have recognized that there is a need for an apparatus that assists in reducing dispatches at remote hubs. In one embodiment, an analog cross-connect (AXC) switch is deployed to further reduce the number of cross-connections at the hub. The AXC cross-connects subscriber lines to feeder lines under remote control, such that dispatches for these lines are not necessary.

The first step in cross-point reduction is to deploy an AXC according to the penetration rate and churn rate of the line groups ($1^{st}$ line, $2^{nd}$ line etc.). Each group of subscriber lines is evaluated separately and the deployment decision includes connecting the subscriber lines to the feeder lines directly, connecting the subscriber lines to an AXC switch, or terminating the subscriber line group at the hub, where the terminated lines are connected to the feeder lines via dispatches on an as needed basis.

In one embodiment, further reduction in cross-points may be achieved by partitioning the AXC into smaller but separate switching modules. This reduction comes at the expense connecting more feeder lines to the AXC.

Further reduction of an AXC switch for the canonical configuration may be provided by decomposing the AXC into two subsystems. The decomposed system has much fewer cross-points than the original system, and thereby has lower cost and requires less space. Lower costs and reduction in space are both critical features for a remote hub.

In another embodiment of the invention, one of the decomposed sub-systems is replaced by a splitter, further reducing the number of cross-points needed. The trade-off between the two embodiments is cost of the splitter versus the cost of an AXC switch.

Further reductions in the number of cross-points of the AXC switch may be provided by partitioning the AXC switch. Partitioning may be performed on either a non-decomposed or a decomposed AXC switch. The method of partitioning may illustratively be practiced for the decomposed embodiment to further reduce the number of cross-points further, but at the expense of more DSLAM ports or lower coverage rate.

The present invention is applicable for hubs providing POTS service, DSL service (with or without line-sharing), and an integrated POTS/DSL solution. Accordingly, the present invention helps alleviate space constraints at the hubs by reducing the cross-connect points and sizes of the switches.

BRIEF DESCRIPTION OF THE DRAWINGS

The teachings of the present invention can be readily understood by considering the following detailed description in conjunction with the accompanying drawings, in which.

Figure 1:
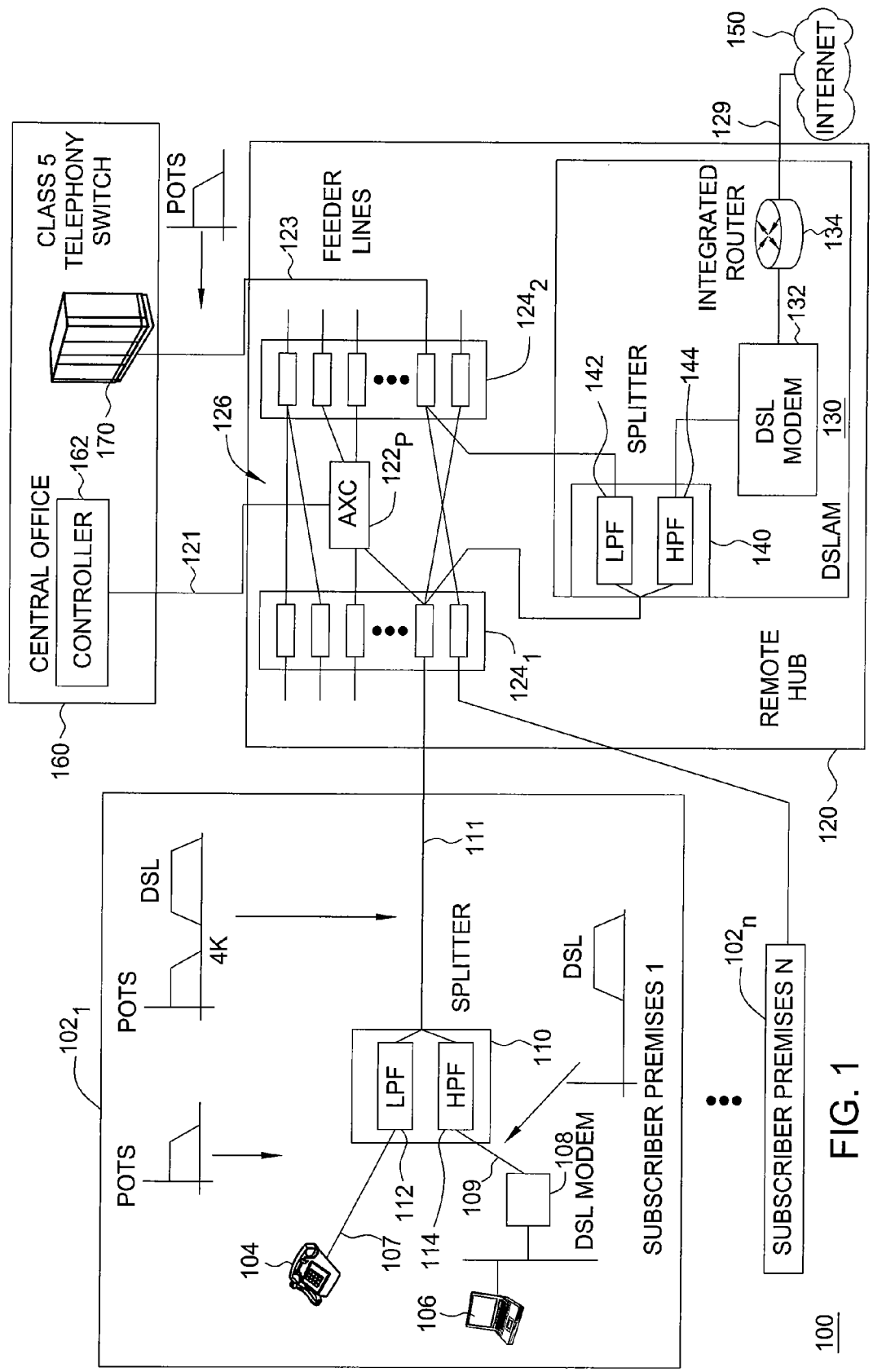
FIG. 1 is a block diagram of an exemplary telephony network environment suitable for supporting the present invention.

To facilitate understanding of the invention, identical reference numerals have been used, where possible, to designate identical elements that are common to the figures. Further, unless specified otherwise, any alphabetic letter subscript associated with a reference number represents an integer greater than one.

DETAILED DESCRIPTION OF THE INVENTION

The present invention provides a method and apparatus to decompose a switch (i.e., automatic cross-connect (AXC) switch) based on its connectivity characteristics. The present invention is capable of determining optimal designs of an AXC that should be deployed at a specific hub for old telephony system (POTS) and digital subscriber line (DSL) services.

Further, the present invention decomposes a switch into several switching modules. By doing so, the number of crosspoints is greatly reduced. Consequently, both the cost and the size of the AXC is also reduced, which are critical factors for deployment of such a switch at a hub.

The invention is independent of the AXC switch technology (robotics, MEMS, among others) and how each switching module is implemented, such as by using a full-matrix, a 3-stage Clos (e.g., strictly non-blocking (SNB), rearrangeable (AR), or wide-sense non-blocking (WSNB) configurations), among other switch configurations. The present invention is applicable to POTS service, DSL services (with or without line-sharing), and a combination (i.e., integrated services) thereof.

FIG. 1 depicts a block diagram of an exemplary telephony network environment 100 suitable for supporting the present invention. The network 100 is illustratively shown as a telephony Service Provider (SP) network for providing plain old telephone system (POTS) and digital subscriber line (DSL) services for clients (customers). The network 100 comprises a plurality of subscriber premises $102_1$ through $102_n$ (collectively subscriber premises 102) that are selectively coupled to a telephone switch 170 and/or a packet switched network 150 (e.g., the Internet), via a remote hub 120.

In particular, each subscriber premises 102 includes conventional analog and digital equipment (e.g., telephone, computer device, and the like) to subscribe to POTS and/or DSL services. Each subscriber premise 102 is coupled to the remote hub 120 via one or more subscriber lines 111, as discussed below in further detail. For example, a subscriber receiving POTS services illustratively has one or more telephones 104 coupled via telephone line 107 to a subscriber line 111 (i.e., "copper loop"), which is coupled to the remote hub 120 of the service provider. It is noted that each subscriber line at a subscriber premise 102, if activated, is associated with a unique telephone number.

Human speech only requires a small amount of bandwidth. Most telephony networks allocate 4 KHz of bandwidth to support a voice channel. However, the copper loop can support much more bandwidth than 4 KHz. By utilizing this extra bandwidth, the copper loop can be used to carry high-speed data through the use of a modulator and demodulator (modem). The modems that are used on subscriber copper loops are referred to digital subscriber line (DSL) modems.

Subscribers of DSL services may utilize a computer device 106 (e.g., a laptop, desktop, or other computer device capable of processing digital information) coupled to a DSL modem 108 via DSL line 109. The DSL modem 108 provides connectivity to the subscriber line 111 by modulating packetized information into an analog signal for transfer over the subscriber line 111. There are many versions of DSL modems representing the continuing advances of this technology. The most prevalent DSL modem currently is ADSL (Asymmetrical DSL), which operates from 26 KHz to 1.1 MHz. In ADSL, the data speed of the downstream direction differs from the upstream direction, as most consumers would receive more data than transmitting when accessing the Internet. The next generation of ADSL is commonly referred to as VDSL (Very high speed DSL). VDSL operates from 138 KHz to 12 MHz. It has maximum data rates of 51.84 Mbps and 2.3 Mps, for downstream and upstream traffic respectively.

Both ADSL and VDSL are designed so that plain old telephony service (POTS) can share the same line with them through frequency division multiplexing. For purposes of describing and implementing the present invention, DSL services are provided on only a single subscriber line 111. That is, only one DSL modem 108 is provided per subscriber premise 102.

For subscribers receiving both POTS and DSL services, a splitter 110 having one low-pass filter (LPF) 112 and one high-pass filter (HPF) 114 is installed at the subscriber's premise 102. As shown in FIG. 1, voice traffic from the phone is coupled to the LPF 112 via telephone line 107, while data traffic from the DSL modem 108 is coupled to the HPF 114 via DSL line 109. Thus, the presence of the splitter 110 accommodates both types of services (POTS and DSL) over a single subscriber line 111.

A remote hub 120 is installed in a neighborhood at a suitable location (e.g., manhole, pole, cabinet, among other locations) for providing service connectivity to a plurality of subscriber premises 102. Each hub 120 illustratively comprises at least one cross-connect switch 122, and may optionally include a digital subscriber line access multiplexer (DSLAM) 130 if DSL services are provided, as shown in FIG. 1. The AXC switch 122 is capable of facilitating transfer of analog signals between subscriber premises 120 for both POTS and DSL services.

Specifically, the remote hub 120 comprises two termination frames $124_1$ and $124_2$ (collectively termination frames 124) for terminating the subscriber lines 111 from the subscriber premises 102, as well as the feeder lines 123 from the central office 160. Typically, the termination frames 124 are capable of terminating and cross-connecting thousands of subscriber lines and feeder lines.

Appropriate wiring connection lines (i.e., cross-connect points) 126 are made between the two frames 124 to provide end-to-end connectivity from the subscriber premises 102 to a central office 160. At least a portion of the cross-connect points 126 may be provided through one or more switches, such as an automatic cross-connect (AXC) switch $122_p$, where p is an integer greater than zero. Although only a single subscriber line is shown between the subscriber premise 1 $120_1$ and the first termination frame $124_1$, a person skilled in the art will recognize that this single subscriber line 111 represents a line pair. Further, although only one subscriber line pair 111 is shown between the subscriber premise 1 $120_1$ and the AXC switch 122, a person skilled in the art will recognize that a single AXC switch 122 may be coupled to, for example, hundreds of subscriber lines (pairs) 111. In fact, since there are typically 3-5 subscriber line pairs to each subscriber premise (household) 102, a single hub may terminate 1500 to 2500 subscriber lines 111.

Similarly, although only a single feeder line 123 is shown between the second termination frame $124_2$ and the central office 160, a person skilled in the art will recognize that this single feeder line 123 also represents a line pair. Further, although only one feeder line pair 123 is shown between a single AXC switch 122 and the central office 160, a person skilled in the art will recognize that a single AXC switch 122 may be coupled to, for example, hundreds of feeder lines (pairs) 123 that are subsequently routed to the central office 160.

When implementing the line-sharing option (i.e., the hub also facilitates DSL services), the DSLAM 130 at the remote hub 120 is connected as an access point 126 between the subscriber line side 111 and the feeder line side 123 of the AXC 122. In one embodiment as shown in FIG. 1, the DSLAM 130 comprises a splitter 140, a DSL modem 132, and an optional router 134. The splitter 140 includes a LPF filter 142 that passes low frequency voice (POTS) signals to the telephony switch 170 for routing to other subscriber premises 102.

Specifically, the LHF 142 ensures that the spectrum between phone 104 and the splitter 140 operates only from 0 to 4 KHz. The splitter 140 also includes a HPF filter 144 that ensures that the spectrum between subscriber's DSL modem 108 and the splitter 140 at the hub 120 operates at the high frequency band. The HPF 140 passes the high frequency DSL signals to the DSL modem 132, where the received DSL analog signals are demodulated into a packetized format (e.g., IP packets) and forwarded to the router 134 for routing. The router 134 forwards the packetized information to a particular destination node, over a high speed data line 129 associated with a packet switched network, such as the Internet 150, an intranet, or combination thereof.

Although the splitter 140 is illustratively shown as being implemented in the DSLAM 130, one skilled in the art will appreciate that the splitter 140 may be installed elsewhere in the hub 120 as a separate filtering unit, illustratively positioned proximate the DSLAM 130.

The AXC switch 122 may be implemented in various forms at the remote hub 120. For example, given a cross-connect switch 122 with M input ports and N output ports, the simplest implementation is a full matrix consisting of a rectangular array of M×N cross-points. For a cross-connect with N inputs and N outputs, there is $N^2$ cross-points. This architecture is not efficient where large amounts of subscriber lines and feeder lines are being connected at the switch. The architecture is also not scaleable as the number of cross-points grows quadratically with respect to the N inputs and outputs. However, because of its simplistic configuration, it is usually used as a benchmark in comparing different switch sizes and architectures.

Alternatively, a Clos switching architecture for a non-blocking switch requires much less cross-points. The Clos switch consists of a number of stages, the simplest one having three stages, as conventionally known in the art. Using an exemplary 3-stage Clos network as the basic building blocks, a multi-stage architecture can be developed. As the number of stages increases, more reduction can be achieved for large N. However, with each additional stage there is an added cost of wiring between stages, as well as the need of a complex control algorithm to route through the successful stages of the switch. Also, each stage adds attenuation to the signal, which places practical limits on the number of stages feasible. The Clos network is not the only switching architecture. Other switching architectures are possible, each having distinct characteristics.

Further, there are three types of non-blocking switches. A first type is a strictly non-blocking (SNB) switch. For SNB switches, the user can always establish a new connection regardless of the current state of the switch, and without disturbing the current connections. A second type of switch is a rearrangeable (AR) switch. For AR switches, the user can always establish a new connection. However, the user may have to rearrange some of the current connections to accommodate the new request. A third type of switch is a wide sense non-blocking (WSNB) switch. Associated with each WSNB is also a routing algorithm, which is used in establishing connections through the switch. For WSNB switches, the user can always establish a new connection without disturbing the current connections, as long as all the previous connections are routed by using the designated algorithm. These non-blocking type switches, when implemented in a 3-stage Clos switch, require less cross-points than the full matrix switch in instances where the number of input (or output) ports is greater than 36.

The AXC switch 122 may be formed by robotics, relays, and in a preferred embodiment, micro-electro-mechanical systems (MEMS), as conventionally known in the art. In any embodiment, the AXC 122 has to support a current level of 250 to 300 milliamps, which places a minimal size on the wiring and the miniaturized relay of the MEMS chips. However, the present invention is independent of the technology and on how the AXC module is implemented (full-matrix, 3-stage Clos SNB, 3-stage Clos AR, other).

The central office (CO) 160 of the service provider includes a controller 162 and a telephony switch 170. The telephony switch routes voice signals associated with the POTS services between subscriber premises 102 in a conventionally known manner.

In particular, the controller 162 is connected to the AXC switch 122 at the remote hub 120. In one embodiment, one of the feeder lines 123 can be used to provide connectivity to the hub 120. Alternatively, the integrated router at the DSLAM may be used. Through the controller 162, support persons at the CO 160 are able to cross-connect subscriber lines connected to the AXC switch 122 to feeder lines connected to the same AXC. This capability enables SPs to greatly reduce the number of dispatches to manually cross-connect the lines at the remote hub 120.

Another function that the controller 162 performs is to recommend to the service provider the optimal configuration for one or more an AXC switches 122 at a particular hub, including the size of the AXC, and the particular set of subscriber lines and feeder lines that should be connected to the AXC switch 122. The recommendation is based on a number of factors, such as the subscription rate and the churn rate of a service at that hub, the cost of a dispatch, among other considerations.

For example, a hub that is located far away from the dispatch office typically has high dispatch costs. Accordingly, the deployment of an AXC 122 at a hub 120 is more attractive. This second function is an off-line function that does not require connectivity to the AXC. For a detailed understanding of the controller 162 and optimizing connectivity at a hub, the reader is directed to commonly assigned U.S. patent application Ser. No. 10/954,962, filed Sep. 30, 2004, the contents of which are hereby incorporated by reference in its entirety.

In the U.S., the number of subscriber lines 111 entering a subscriber premise 102 is between 3 and 5 lines. For purposes of illustration and discussion henceforth, it is assumed that each subscriber premise 102 has four (4) subscriber lines 111 (i.e., 8 actual lines since each subscriber line represents a line pair). The number of feeder lines may be equal to, less than, or greater than the number of subscriber lines 111 connected to the hub 120. However, as a practical matter to conserve resources and costs, the number of feeder lines 123 is usually less than the number of subscriber lines 111 at the hub 120. For example, approximately 1200 feeder lines 123 are usually adequate to support approximately 2000 subscriber lines 111 per hub 120.

For an exemplary profile having 500 subscriber premises and 4 subscriber lines per subscriber premise, in one exemplary embodiment, a direct solution for providing connectivity is to deploy an AXC 122 of size 2000×1200, where 2000×1200 represents the number of subscriber lines and feeder lines respectively. It is noted that a full matrix implementation of the switch requires 2.4 M cross-points, while a 3-stage rearrangeable Clos implementation of the above 2000×1200 switch results in approximately 217K cross-points. To implement the 217K cross-points using current technology, MEMS technology supports approximately 50 cross-points per MEMS chip, and each board holds approximately 150 chips. This results in 7.5K cross-points per board. Therefore, approximately 29 boards (217K/7.5K) to implement a 2000×1200 switch having 217K cross-points. Such a high quantity of cross-connect boards exceeds the size/space constraints for a conventional remote hub 120. The focus of this invention is to identify techniques to design AXC so that the number of cross-points are drastically reduced.

The present invention is first described by illustration for the case where the service provider only provides POTS services, and at least one AXC switch 122 is deployed to eliminate service provisioning dispatches for the POTS service. Thereafter, the present invention is described for the case where DSL services are also provided by the service provider.

It is noted that the four subscriber lines per household 102 have different characteristics. As most households usually subscribe to one POTS line, the first line has a very high penetration rate but very low churn rate. For example, the first line usually gets disconnected when a subscriber moves, but the next tenant will subscribe to the service when they move in. On the other hand, the fourth line usually has a very low penetration rate but a high churn rate.

By illustration, the characteristics of the lines of a service provider may be identified as shown below in TABLE 1. It is noted that the values presented in TABLE 1 are for illustrative purposes only.

TABLE 1

| Line number | Penetration Rate | Churn rate |
| --- | --- | --- |
| $1^{st}$ line | 95% | 1% |
| $2^{nd}$ line | 60% | 10% |
| $3^{rd}$ line | 25% | 25% |
| $4^{th}$ line | 10% | 30% |

Figure 2:
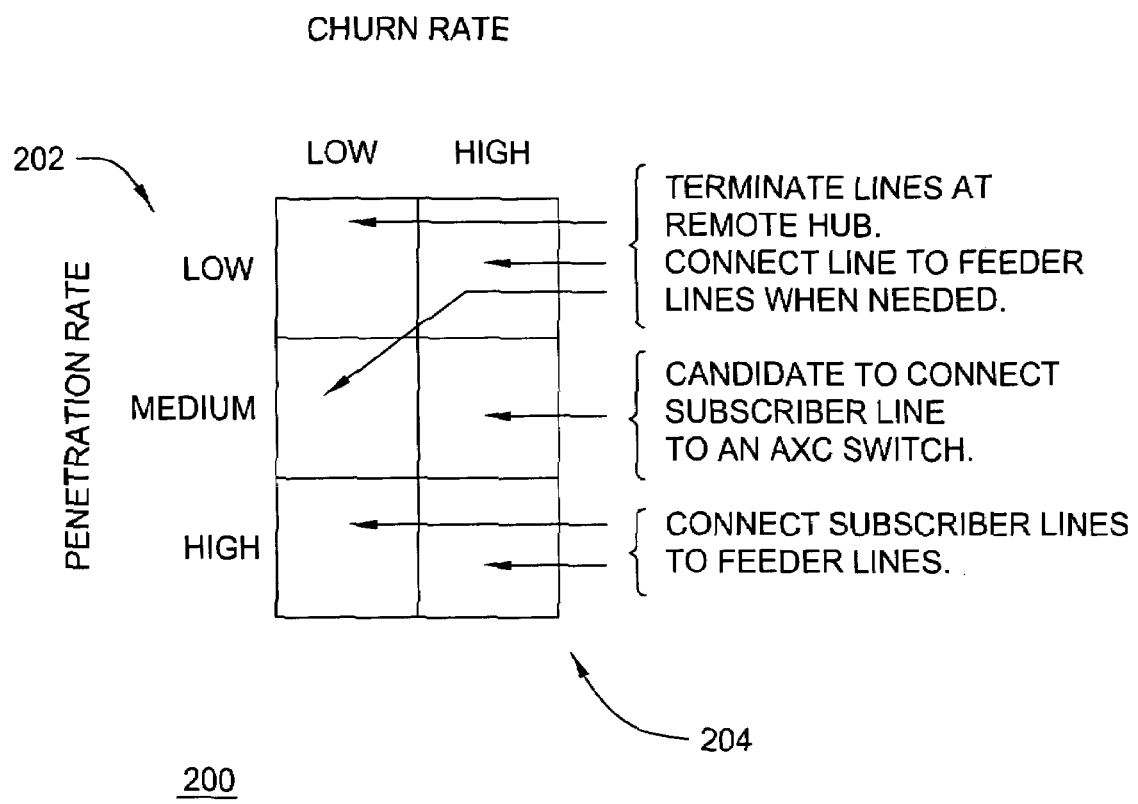
FIG. 2 is a graphical representation of a wiring policy at a remote hub.

FIG. 2 is a graphical representation 200 of a wiring policy at a remote hub 120. The graph 200 comprises an ordinate 202 representing penetration rates (high, medium, and low) and an abscissa 204 representing the churn rate (low and high). The policy for the treatment of a particular line depends on its characteristics. Specifically, for lines that have a high penetration rate, regardless of its churn rate, the subscriber line is directly connected to a feeder line. This policy would be applicable to subscriber line 1 in the above example.

For lines that have low penetration rate, regardless of its churn rate, the policy is to terminate the subscriber line at the remote hub 120 until it is needed. At that time, a dispatch is sent to connect the subscriber line to a feeder line. The fourth line in the above example fits these characteristics. In the example above, there are 500 fourth lines. On the average, about 50 (10%) of them are active. These 50 lines would result in about fifteen (50×30%) dispatches per year. This policy provides that it is not economical to eliminate these 15 dispatches by the use of an AXC 122.

Lines that have an average penetration rate and average to high churn rate are candidates to be connected to an AXC switch 122. The final decision is based on economic factors such as the cost of a dispatch, AXC equipment cost, revenue generated because of fast provisioning, among other factors. The second and third lines in the example fit this category.

Lines that have average to low penetration rate, as well as a low churn rate are treated as the fourth lines. That is, the subscriber lines are terminated at the remote hub 120. When needed, a dispatch is sent to the remote hub to connect the subscriber line to a feeder line. It is noted that the graph of FIG. 2 is described in detail in U.S. patent application Ser. No. 10/954,962, filed Sep. 30, 2004.

Figure 3:
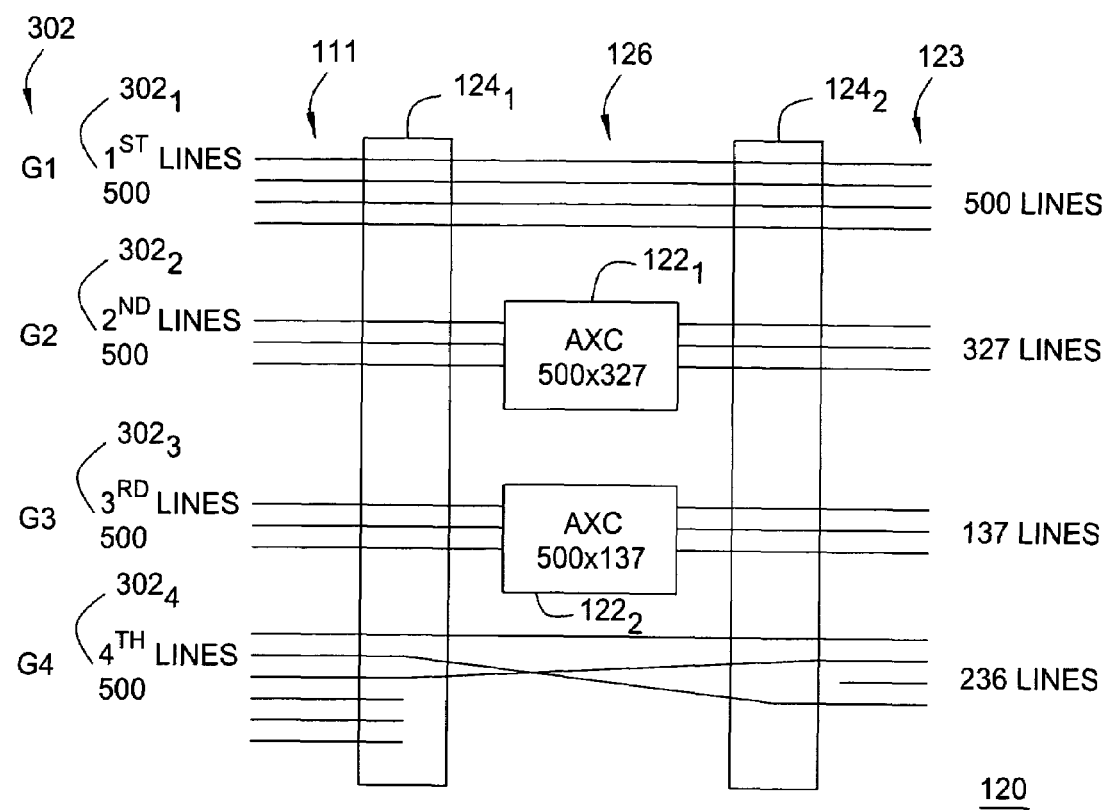
FIG. 3 is a block diagram of a logical wiring arrangement at an exemplary hub in accordance with the principles of the present invention.

FIG. 3 is a block diagram of an exemplary wiring policy of a hub. In particular, four exemplary groups of subscriber lines 111 are shown coupled to the first termination frame $124_1$. Continuing with the above example of 500 subscriber premises supported by the hub 120, where each subscriber premise has four subscriber lines, a total of 2000 subscriber lines are coupled to the first frame $124_1$. Similarly, four groups of respective feeder lines 123 are coupled to the second termination frame $124_2$. It is noted that the number of feeder lines 123 may be less than the number of subscriber lines. A first group G1 $302_1$ is associated with the first of the four subscriber lines to each premise 120. Therefore, the first group G1 302₁ has 500 first subscriber lines. Similarly, the second group G2 302₂ is associated with the second of the four subscriber lines to each premise 120. Therefore, the second group G2 302₂ also has 500 second subscriber lines, and so forth. The first group G1 302₁ is illustratively shown having the 500 subscriber lines coupled directly to the feeder lines. Further, subscriber line group G4 302₄ is terminated at the first termination frame 124₁. The subscriber lines of the fourth group G4 are connected to feeder lines as needed. The wiring is performed manually by dispatch of field personnel.

In this example, it is assumed that deployment of an AXC is justified for the $3^{rd}$ and $4^{th}$ line groups. The sizes of the AXCs (122₁ and 122₂) are 500×327 and AXC 500×137, respectively.

The size of the AXC (122) is determined through a key concept of coverage rate. The coverage rate (for a particular value of feeder lines) is the percentage of the churn that can be handled by the AXC switch without having to initiate a dispatch. Thus, the percentage value for when a dispatch is necessary is 1 minus coverage rate (1−x %, where x≧0).

Consider the above example shown in FIG. 3. It is assumed that it is desirable to connect all 500 of the $2^{nd}$ subscriber lines 302₂ to the AXC 122₁. Accordingly, a determination must be made regarding the appropriate number of the feeder lines that should be connected to the AXC 122₁. If a large number of feeder lines are connected, a large AXC is required, thereby increasing the costs of the system. On the other hand, if only a small number of feeder lines are connected to the AXC 122₁, the number of second subscriber lines may exceed the total number of feeder line at the hub 120, such that dispatches may become necessary to provide service.

The number of the feeder lines that is necessary to support a desired coverage rate may be computed from the penetration rate. Let there be a group of N subscriber lines with the same characteristics with a penetration rate of "p." Following the above example, in TABLE 1 subscriber line 2 illustratively has a penetration rate of 60%. The number of lines N in this second group is 500 subscriber lines (N=500). The number of lines that are illustratively considered active for this second group 302₂ follows a binomial distribution, as shown in TABLE 2.

TABLE 2

| Parameter | General formula | Value for Example |
| --- | --- | --- |
| Mean (m) | N * p | 300 |
| Variance ($\sigma^2$) | N * p * (1 − p) | 120 |
| Standard deviation ($\sigma$) | $((N * p * (1-p)))^{1/2}$ | 10.95 |

The binomial distribution can be approximated by the normal distribution and a table of coverage rate versus number of feeder line can be easily constructed as shown in TABLE 3. It is noted that the value identified with the asterisk (*) is a value obtained by using a conventional normal distribution table.

TABLE 3

| Number of feeder lines | | | |
| --- | --- | --- | --- |
| Value | as m & $\sigma$ | Coverage rate | Dispatch rate |
| 327 | m + 2.46 * $\sigma$ | 99% | 1% |
| 329 | m + 2.64 * $\sigma$ | 99.5% | 0.5% |
| 335 | m + 3.1 * $\sigma$ | 99.9% | 0.1% |

Therefore, if an AXC of size 500×330 is deployed to support the second line, such switch would eliminate 99.5% of the dispatches in service provisioning. An AXC of size 500× 335 would eliminate 99.9% of the dispatches. Note that for a churn rate of 10% per year, there are approximately a total of 30 dispatches. For all practical purpose, all dispatches are eliminated.

Similar exemplary values may be determined for the third line (e.g., group 302₃ of FIG. 3), as shown in TABLE 4.

TABLE 4

| Number of feeder Lines | | | |
| --- | --- | --- | --- |
| Value | as m & $\sigma$ | Coverage rate | Dispatch rate |
| 137 | m + 2.36 * $\sigma$ | 99% | 1% |
| 138 | m + 2.6 * $\sigma$ | 99.5% | 0.5% |
| 141 | m + 3.1 * $\sigma$ | 99.9% | 0.1% |

Continuing with the example provided above, the first subscriber line group 302₁, which has a high penetration rate, is directly connected to feeder lines. The fourth subscriber line group 302₄, which has as low penetration rate, is illustratively terminated at the remote hub. Additionally, both the second and third subscriber line groups 302₂ and 302₃ are candidates to be connected an AXC switch 122, such as AXCs 122₁ and 122₂, respectively.

By selectively deploying individual line groups on an as needed basis as illustrated in FIG. 3, the number of cross-points is reduced when comparing to deploying a single AXC (e.g., full matrix) connecting all subscriber and feeder lines. A comparison of the number of cross-points is illustratively shown below in TABLE 5.

TABLE 5

| Number of Cross Points (in thousands) | AXC 122₁ | AXC 122₂ | Total |
| --- | --- | --- | --- |
| Full Matrix | 163.5 | 68.5 | 232 |
| Clos 3-Stage SNB | 51 | 31.1 | 82.1 |
| Clos 3-Stage AR | 28.6 | 21 | 59.6 |

By comparison, a single AXC that connects all the subscriber lines to the feeder lines would respectively have 2400 K, 381K and 217K cross points for the full matrix, Clos 3-Stage SNB, and Clos 3-Stage AR switches. It is noted that the configuration of FIG. 3 is shown and discussed for illustrative purposes only, and one skilled in the art will appreciate that economic analyses (e.g., cost/benefit analyses) may provide other hub configurations. For example, the economic analyses may show that only the second lines (second group G2) 302₂ should be connected at the AXC 122₁, while the third lines 302₃ should be terminated at the remote hub. It is further noted that other configurations are also possible (e.g., both second and third subscriber line groups 302₂ and 302₃ are terminated at the remote hub).

Assuming a coverage rate of 99%, in order to support the second line group 302₂ in this example, an AXC of size of 500×327 is required. It is noted that in some applications, this switch may still be too big or costly to implement. Another technique to further reduce the switch size is via partitioning. That is, the selected AXC switch 122 may be further partitioned to reduce the number of cross-points needed. However, the number of feeder lines that are connected to the AXC will increase. The exemplary 500 subscriber line switch may illustratively be partitioned into smaller groups, such as four groups each having 125 lines.

To maintain the dispatch at a desirable rate of 1%, each partition should have a dispatch rate of 0.25% or a coverage rate of 99.75%. Accordingly, 91 feeder lines should be utilized for each partition. This results in four AXC switches, each of the size 125×91. Using the full matrix implementation as a reference, the number of cross points are 500*327=163.5K for the non-partitioned case, as compared to 4*125*91=500*91=45.9 K cross-points for the partitioned case, which is approximately one-third of the original size.

Figure 4:
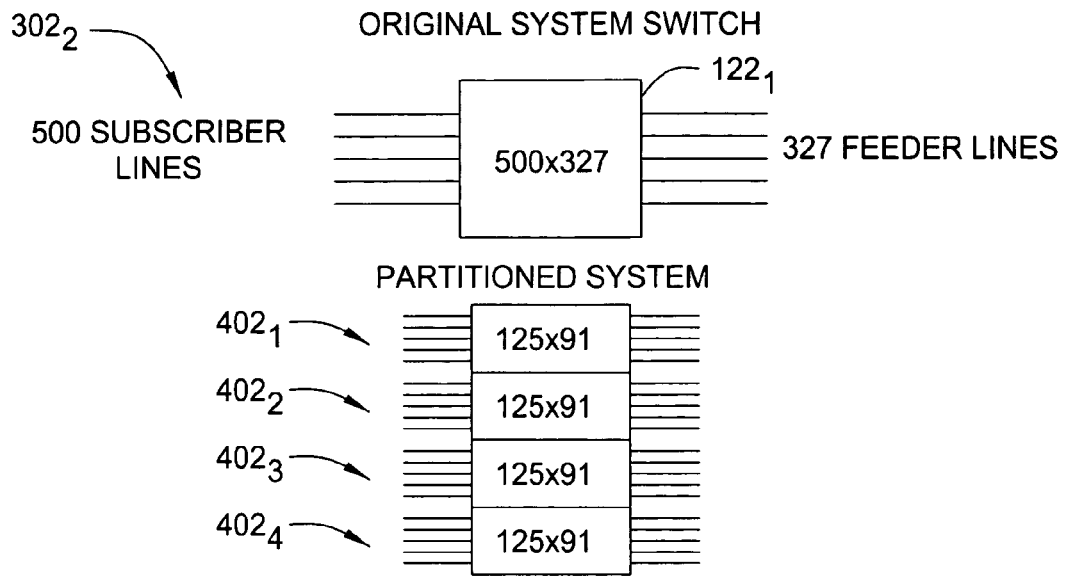
FIG. 4 depicts a partitioned AXC switch in accordance with the principles of the present invention.

FIG. 4 depicts a partitioned AXC switch 122 in accordance with the principles of the present invention. In particular, the AXC switch $122_1$ illustratively shown in FIG. 3 having a size of 500×327 is partitioned into four partitions $402_1$ through $402_4$, where each partition has a size of 125×91 subscriber lines to feeder lines. It is noted that the 91 feeder are computed based on the fact that there are four partitions. Specifically, for the total to have a dispatch rate of 1%, each partition needs to have a dispatch rate of 0.25%. As a result, each partition needs to have a coverage rate of 99.75%, instead of the usual 99.0%. For 99.75%, approximately 2.72 times sigma ($\sigma$), the standard deviation, is used to compute the number of feeder lines in a similar manner discussed above.

Accordingly, there are considerable savings in terms of number of cross-points. However, the AXC must be designed with partitioning in mind so that the cost reduction can be realized. Furthermore, deploying four partitions causes the number of feeder lines goes up from 327 to 364, which may not be acceptable in situation where the feeder lines are severely limited. Moreover, management of a partitioned network may be slightly more complicated. Therefore, there are considerable trade-offs whether partitioning is beneficial or not. However, a conventional business case type analysis on the net present value or the break-even period may be used in deciding whether to partition a switch.

The present invention has so far been discussed when POTS services are being provided by the service provider at a hub. The present invention is also addresses for when DSL services are available to the subscriber premises. It is noted that while POTS service typically has a low churn rate, the DSL service typically has a high churn rate. In particular, the DSL service has a modest penetration rate, but a high churn rate of approximately 20% per year. Therefore, the AXC switch, in conjunction with the present invention, is useful to help reduce the number of dispatches of the DSL service.

Continuing with the example above, in addition to the previous assumption of 500 homes served, 4 subscriber lines per home, and 1200 feeder lines, additional assumptions are necessary when the DSL service is provided. A first assumption is there is a maximum of one DSL subscriber per household (i.e., subscriber premise). This is a reasonable assumption since the DSL modem 108 at the subscriber premise is ultimately connected to a router 134. Specifically, all of the customer's terminal equipment is connected to this router, and thus the DSL service, through a local area network.

A second assumption is that the penetration rate for DSL is 50% per household. This assumption is based on marketing projections that expect 50% of the households to utilize some form of DSL service.

A third assumption is that a DSLAM 130 is deployed at the remote hub 120. Deploying the DSLAM 130 at the remote hub 120 reduces the distance between the DSLAM 130 and the customer premise 102. By shortening the distance between these two points (DSLAM and subscriber premises) the DSL service can operate at near maximum speed, which enables the service provider to offer more services (such as video).

Another assumption is that the line sharing option for DSL is supported. Specifically, a service provider can provide both voice (POTS) and digital (DSL) services over a single subscriber line. Note that these assumptions are for illustrative purposes only, and the invention still applies without these assumptions.

Figure 5:
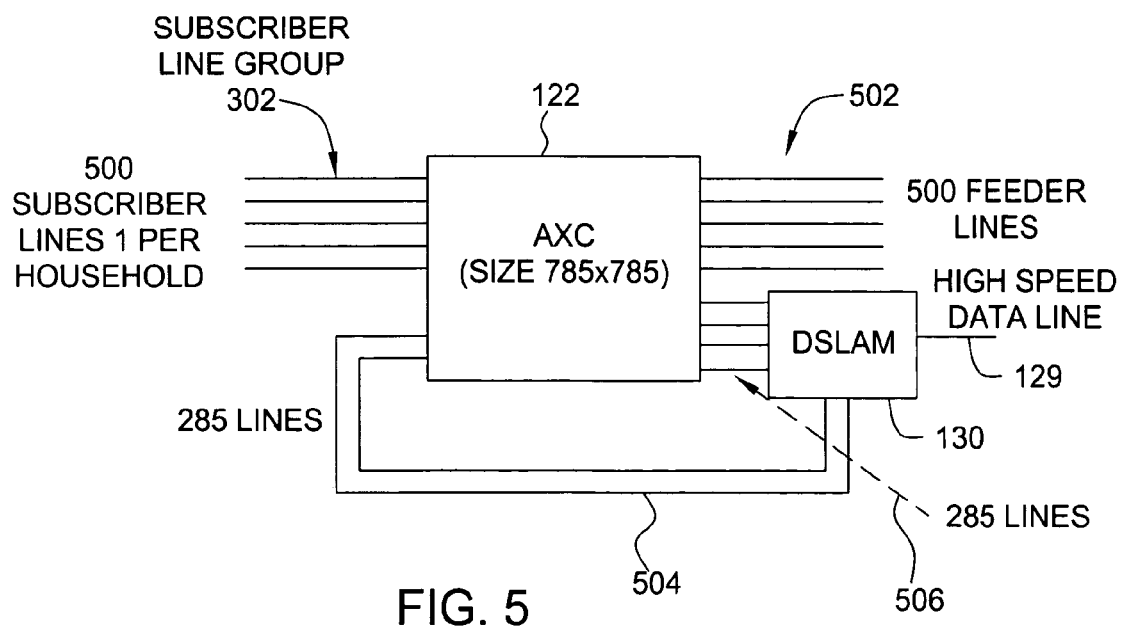
FIG. 5 is a block diagram of an exemplary switch suitable for providing DSL service with a line sharing option.

FIG. 5 is a block diagram of an exemplary switch suitable for providing DSL service with a line sharing option. The exemplary switch 122 is depicted as coupling a group of subscriber lines 302 to a first plurality of feeder lines 502. Further, a DSLAM 130 is coupled to a second plurality of feeder lines 506. The DSLAM 130 comprises a high speed data line 129 that may be coupled to a router or switch (not shown), and a plurality of feedback lines 504 that are fed back as input lines to the AXC 122.

Specifically, as each household only has at most one DSL line, only one subscriber line from each household (line group 302) needs to be connected to the AXC 122. If a customer subscribes only to POTS services for this subscriber line, the subscriber line (in line group 302) is cross-connected to one of the feeder lines in feeder line group 502. If the subscriber line is used for DSL service with or without POTS service, the subscriber is cross-connected to a line in group 506. The lines in group 506 are connected to the DSLAM 130. If POTS service is not subscribed, the DSL signal will be terminated at the DSLAM 130. If the line sharing option is used for that particular line (i.e. POTS service is also provided on that line), the splitter 140 (FIG. 1) at the DSLAM 130 will split the POTS signal from the multiplexed signal sent from the subscriber premises 102, and forward the POTS signal back to AXC 122 using line group 504. The AXC 122 then cross connects the line (in group 504) to a feeder line in group 502.

As discussed above with respect to step 514 of method 500 for POTS services, the size of the various line groups are first determined. The exemplary group 302 includes 500 lines, one line per household. The first step is to determine the number of DSL ports needed for a given DSL-coverage rate. The technique described above regarding coverage rates for the POTS service can be applied for DSL service as well. For a 50% penetration rate, the average (m) for 500 households is 250. The standard deviation ($\sigma$) is approximately 11.2

$$(\text{i.e., } \sqrt{(500)(0.5)(0.5)} \approx 11.2).$$

For a DSL-coverage rate of 99.9%, the number of DSL ports is approximately equal to 285 (i.e., (m+3.1$\sigma$) ~285 DSL ports, where m=250). Thus, 285 feeder lines are required from AXC 122 to the DSLAM 130.

Thereafter, a determination is made for the number of feeder lines at group 502 that should be connected to the AXC 122. Group 502 represents connectivity for POTS service. To compute the number of feeder lines at group 502, the penetration rate for regular POTS for the subscriber line in group 302 is required. Assuming that this is the first line group having a high penetration rate (e.g., group $302_1$), then the optimal number of feeder lines in group 502 equals to the number of subscriber lines, which is 500 feeder lines in this example.

The size of line group 504 depends on the penetration rate of the line sharing option among DSL subscribers. The simplest design is to assume that this rate is 100%. In this case, line group 504 is the same size as line group 506, namely 285 lines. This configuration is referred to as the canonical configuration (i.e., normalized configuration), as it will work in all conditions (e.g., changing line group $302_1$ to the second line group $302_2$, lowering the line sharing option penetration rate, among other configurations). That is, the size of line group 504 is the same as line group 506, as opposed to a non-canonical configuration, where line group 504 does not equal line group 506.

Therefore, for the canonical configuration, the number of upstream ports at the AXC 122 is 500+285=785 ports. Similarly, the number of downstream ports is also 785 ports. The system size of the AXC is then 785×785. The final step is to perform a cost/benefit analysis to verify whether the deployment of the AXC is economically justifiable.

If the DSL service does not support the line sharing option, then the line group 504 is not necessary, and the AXC has a reduced size of 500×785. The canonical configuration (785× 785), though slightly larger, represents the most flexible conditions, as the configuration will work for other scenarios (e.g., second line group $302_2$, third line group $302_3$, and so forth).

It is noted that it is not necessary to have the same number of feeder lines that are connected to the AXC equal to the number of subscriber lines connected. However, in order to do so, the service provider first needs to determine the characteristics of line group 302 (e.g., first line group $302_1$ or second line group $302_2$). The SP will also need to determine the penetration rate of POTS, DSL, and the line sharing option. Details on how to determine their size are discussed below.

It is noted that a SP may also offer voice over IP (VoIP) service over DSL. It is likely that when a DSL subscriber uses the VoIP service instead of DSL service over the second line, the penetration rate for line sharing option will be much lower, and a reduction in the AXC switch size would be more pronounced.

The technique of partitioning is also applicable for DSL services (i.e. to the AXC as illustrated in FIG. 5.). However, partitioning also increases the number of the DSLAM ports required. Typically, the size of DSALM 130 is severely limited at the remote hubs 120 because of hub space constraints. Accordingly, partitioning may not always be practical in many instances.

DSL services are usually offered in conjunction with POTS service. The AXC for both solutions can be merged. The merged AXC will be an AXC whose size is the maximum of the two components. Consider the example for POTS in FIG. 3. If DSL service is also offered, the more efficient configuration is to merge AXC $122_1$ with the canonical configuration for DSL, as illustrated in FIG. 6.

Figure 6:
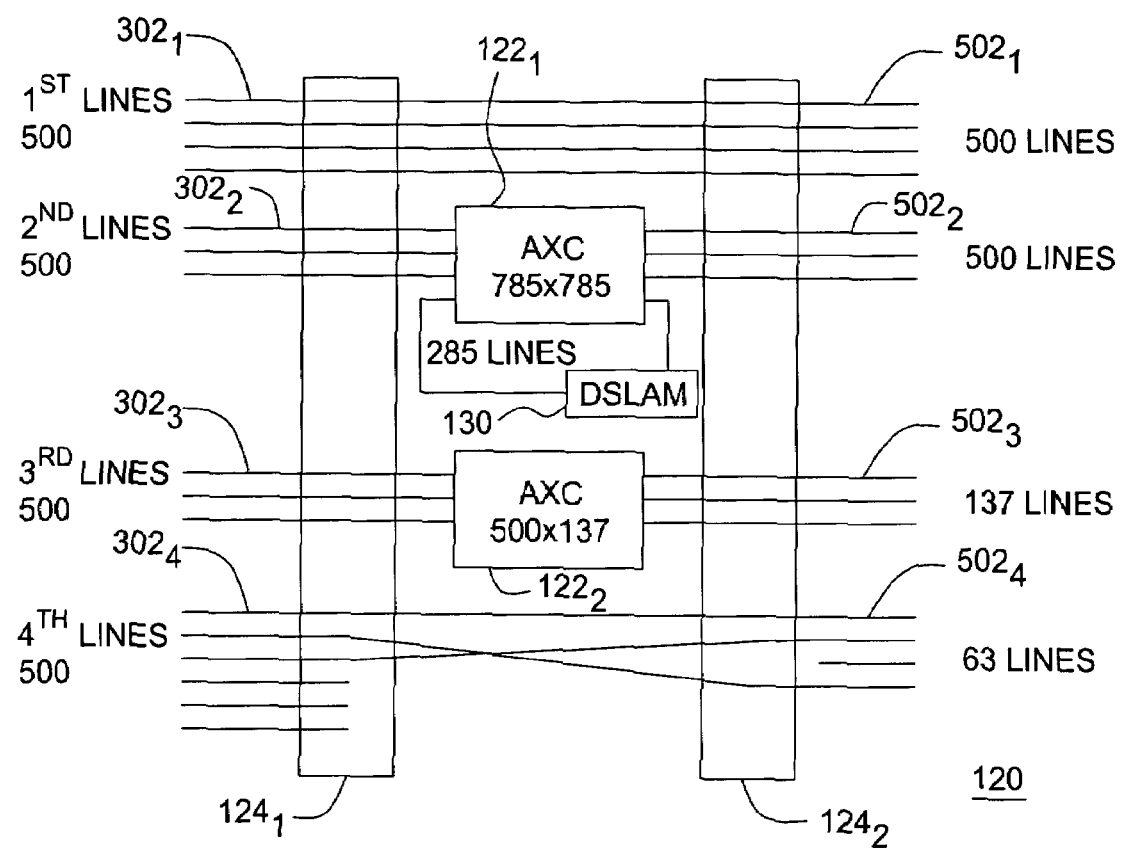
FIG. 6 is a block diagram of a logical wiring arrangement integrating POTS and DSL services at an exemplary hub, in accordance with the principles of the present invention.

FIG. 6 is a block diagram of a logical wiring arrangement integrating POTS and DSL services at an exemplary hub, in accordance with the principles of the present invention. That is, the integrated solution is illustrated in FIG. 6. FIG. 6 is identical to FIG. 3, except that the 500×327 AXC $122_1$ for the second line in FIG. 3 is replaced with a 785×785 sized AXC switch configuration shown in FIG. 5.

Specifically, the exemplary 500 first subscriber lines of group 1 $302_1$ are directly coupled to 500 feeder lines. The exemplary 500 second subscriber lines of group 2 $302_2$ are coupled to AXC switch $122_1$ having a size of 785×785, meaning the switch accommodates 500 second subscriber lines being coupled to 500 feeder lines, plus 285 DSL lines being fed back from the output ports of the DSLAM 130 to the input ports of the switch $122_1$. The exemplary 500 third subscriber lines of group 3 $302_3$ are coupled to AXC switch $122_2$ having a size of 500×137, meaning the 500 second subscriber lines are coupled to 137 feeder lines. Finally, the exemplary 500 fourth subscriber lines of group 4 $302_4$ are terminated at the hub 120, and are coupled to feeder lines by dispatch, as needed.

In most instances, the canonical AXC configuration for DSL is the larger switch when compared to the AXC for POTS services. The end-result is that the canonical configuration serves as the AXC for one of the line groups (typical the $1^{st}$ or $2^{nd}$ line). Therefore, it will be advantageous to reduce the number of cross-points further for the canonical switch.

Further optimization may be provided by reducing the size of the canonical switch. In one embodiment of the present invention, an AXC switch 122 at the remote hub 120 may be decomposed into two subsystems. A decomposed system has much fewer cross-points than the original system, and thereby results in lower costs and requires less space. The decomposition of an AXC switch is shown and described with respect to FIGS. 7-12 in terms of the exemplary conditions, assumptions, and examples that were illustratively provided in FIGS. 1-6.

Figure 7A:
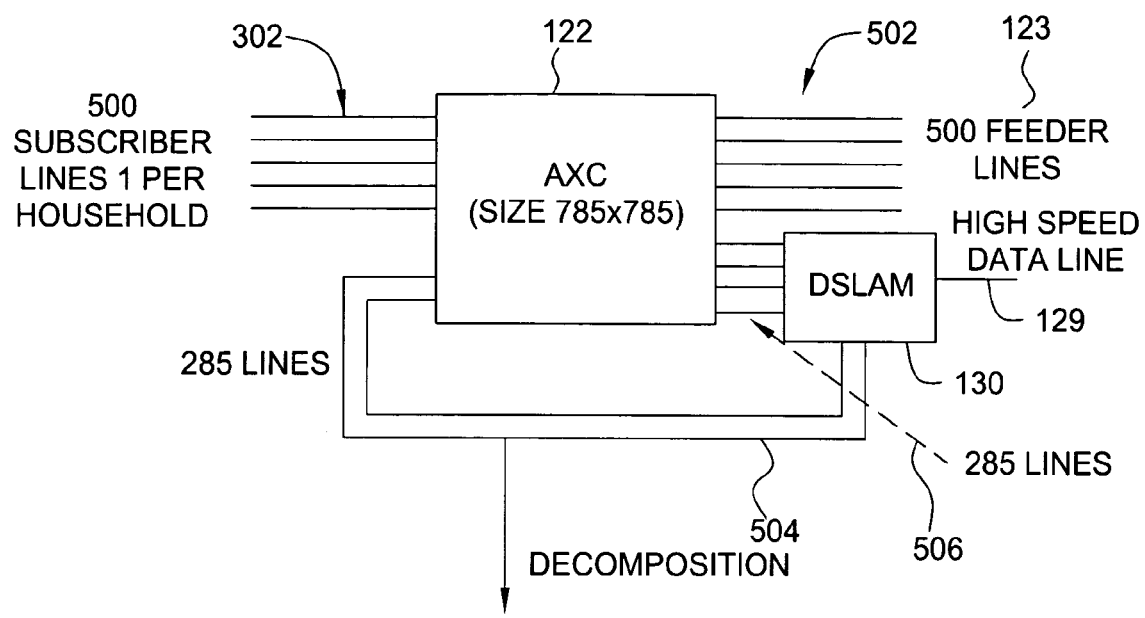
FIGS. 7A and 7B collectively depict a block diagram illustrating decomposition of the exemplary switch of FIG. 5, in accordance with a first embodiment of the present invention.
Figure 7B:
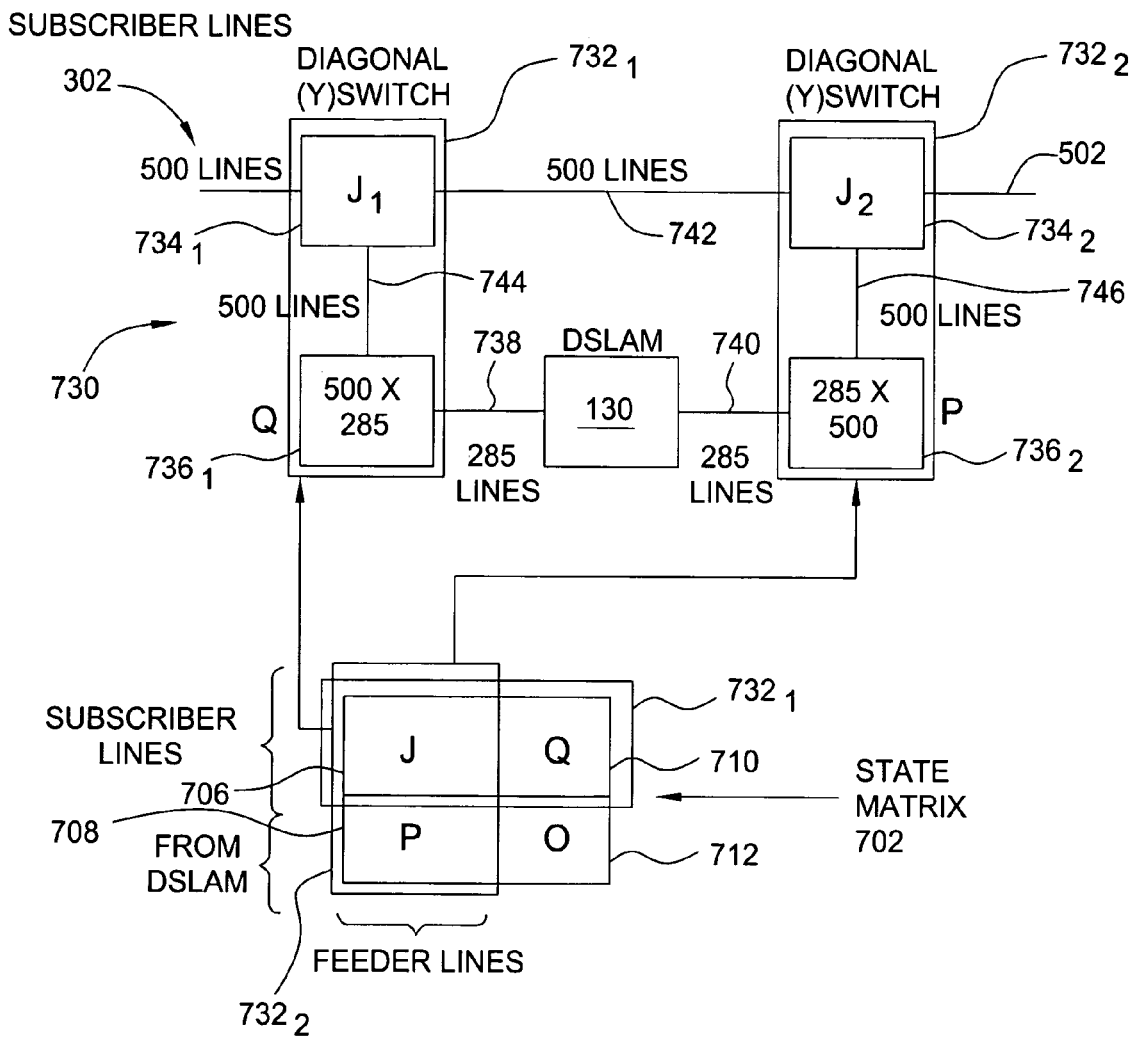

FIGS. 7A and 7B collectively depict a block diagram illustrating decomposition of the exemplary switch 122 of FIG. 5, in accordance with a first embodiment of the present invention. As shown in FIG. 7A, the 785×785 switch is coupled between the group of 500 subscriber lines 302 and the group 502 of 500 feeder lines. Further, the switch 122 illustratively has a group 506 of 285 DSLAM lines coupled to the DSLAM 130, as well as a group 504 of 285 lines are fed back to the switch 122.

Referring to FIG. 7B, the decomposition of this exemplary switch 122 results in a decomposed switch 730 having two switch subsystems $732_1$ and $732_2$ (collectively switch subsystems 732), identical in structure, one on each side of the DSLAM 130. The first subsystem $732_1$ is situated between the subscriber lines 302 and the DSLAM 130 and comprises a first diagonal (or Y) switch $734_1$ and a first AXC module $736_1$. The second subsystem $732_2$ is situated between the feeder lines 502 and the DSLAM 130 and similarly comprises a second diagonal (or Y) switch $734_2$ and a second AXC module $736_2$.

Figure 8:
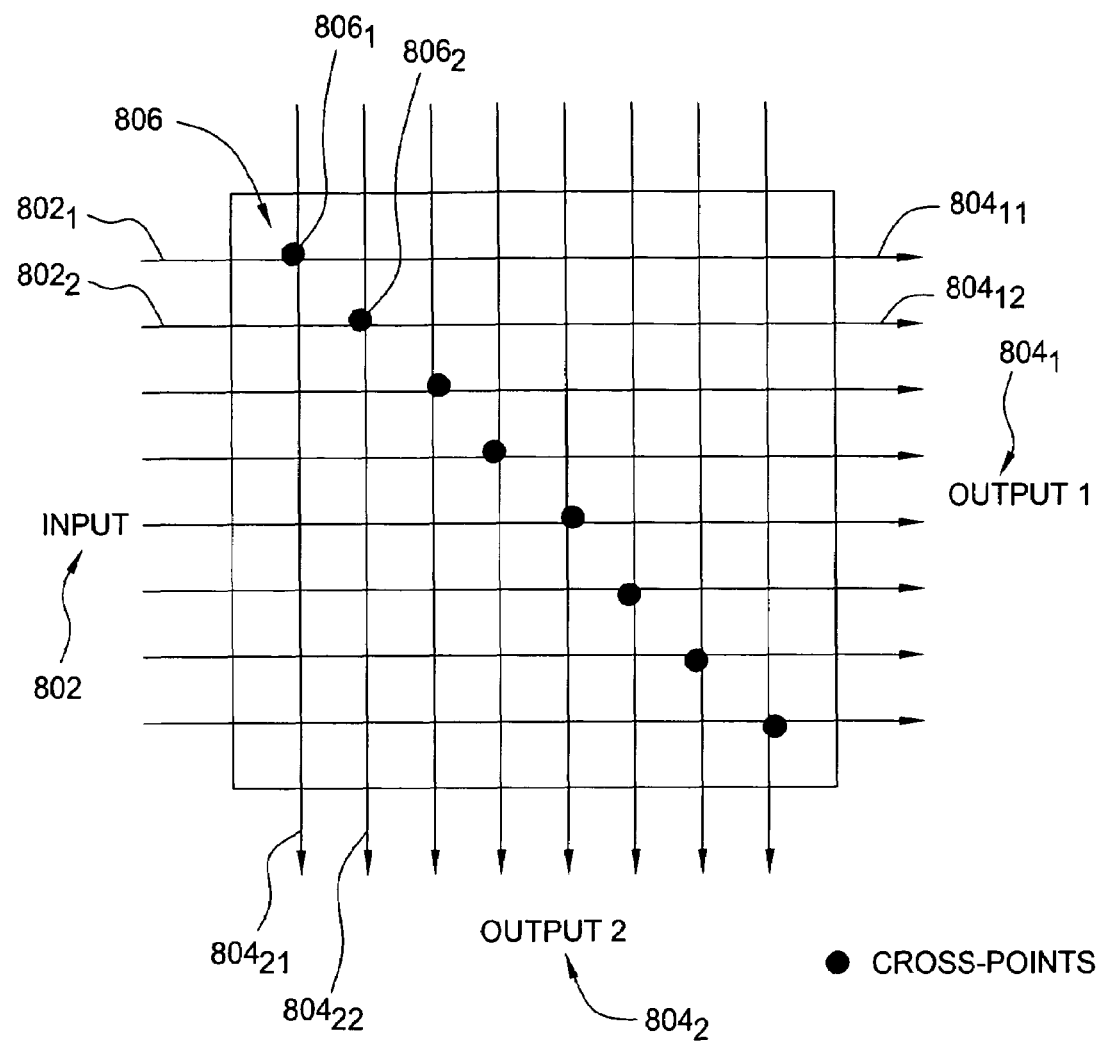
FIG. 8 is a graphical representation of a diagonal switch suitable for use in the present invention.

FIG. 8 is a graphical representation of a diagonal switch 734 suitable for use in the present invention. The graphical representation of the diagonal switch 734 includes N input lines 802 and 2N output lines 804. Specifically, each input line 802 is connected at a respective cross-connect point 806 to either one of two pre-specified output lines $804_1$ and $804_2$. For example, first input line $802_1$ is connected at first cross-connect point $806_1$ to first output $804_{11}$ and second output $804_{21}$. Similarly, second input line $802_2$ is connected at second cross-connect point $806_2$ to first output $804_{12}$ and second output $804_{22}$, and so forth. Thus, a diagonal switch having N inputs also has N cross-points, one for each line. No other input line, except the designated one, can be cross connected to the other output lines. It is noted that the terms input and output are descriptive terms only. While switching analog signals, two lines are switched at the same time. Further, a person skilled in the art will recognize that electric current can flow in either direction. Thus, the diagonal switch serves as a much-simplified cross-connect.

Referring to the exemplary decomposed switch 730 shown in FIG. 7B, the subscriber lines in group 302 are connected to the first diagonal switch $734_1$. For those subscribers who only subscribe to the POTS service (or no service at all), the first diagonal switch $734_1$ cross connects their lines to the peer (i.e., second) diagonal switch $734_2$ through line group 742. It is noted that although only a single line 742 is shown between the diagonal switches 734, this line 742 represents a plurality of cross-connect lines, which are equal in number to the quantity of subscriber lines. For example, if there are 500 subscriber lines in subscriber line group 302, then there are 500 cross-connect lines in group 742, and 500 feeder lines in group 502.

The second diagonal switch $734_2$ cross-connects the lines 742 to the feeder lines in group 502. Accordingly, groups 302, 742, and 502 are all the same size. There is a one-to-one fixed mapping of the wires between the three groups. That is, the $i^{th}$ line in group 302 is always mapped to the $i^{th}$ in group 742 which in turn, is mapped to the $i^{th}$ line in group 502.

When a customer subscribes to DSL service (say the $i^{th}$ line), the first diagonal switch $734_1$ cross-connects the line to the first AXC module $736_1$ through line group 744. The first AXC module $736_1$ cross-connects the line to one of the available ports of the DSLAM 130 through line group 738. A splitter (not shown) at the DSLAM 130 splits the POTS signal and forwards the POTS signal to the second AXC module $736_2$ through line group 740. The second AXC module $736_2$ switches the signal to the corresponding line (the $i^{th}$ line) of the line group 746 to the second diagonal switch $734_2$. The second diagonal switch $734^2$ then switches the signal to the corresponding feeder line (the $i^{th}$ line) in line group 502.

The size of the AXC modules 734 of the decomposed switch 730 are each of size 500×285 in this example. The number of cross-points for each AXC module 734 is about 142.5K, for a full matrix, 45.5K for a 3-stage Clos strictly non-blocking, and approximately 27K for a 3-stage Clos rearrangeable switch. Each diagonal switch contributes an additional 500 cross-points, and there are two such sub-systems. All together, the total number of cross-points is approximately 286K for a full matrix switch, 92K for a 3-stage Clos strictly non-blocking, and 55K for a 3-stage Clos rearrangeable switch. Thus, the savings are substantial for the full matrix implementation (53.6%), modest for the 3-stage Clos SNB (32.8%), and slightly less for the 3-stage Clos AR (21.4%).

The mathematical foundation for the decomposition is illustrated in FIG. 7B. FIG. 7B further shows that a state of a cross-connect may be represented by a matrix 702. The rows of the matrix 702 represent lines on one side of the matrix, while the columns represent lines on the other side. For convenience of description, the subscriber line side is referred to as the input, while the feeder line side is referred to as the output.

The connectivity of canonical configuration has some special characteristics. In particular, input lines from the DSLAM 130 will not be connected to an output line to the DSLAM 130, as a DSL signal does not pass through the DSLAM a second time. As the number of subscriber lines equals to the number of the feeder lines, a one-to-one mapping can be established between subscriber lines and the feeder lines. The POTS signal of a subscriber line can always be forwarded to a designated feeder line.

Given these characteristics, the state matrix M 702 of the AXC 122 takes on a special form as illustrated in FIG. 7B. The matrix M 702 comprises four sub-matrices 706, 708, 710, and 712. The sub-matrix 712 that connects input lines from the DSLAM 130 to the output line of the DSLAM 130 is designated 0 matrix, as the two groups of lines will never be connected. The sub-matrix 706 that connects subscriber lines to feeder lines, J, is a matrix whose entries are 0, when not on the main diagonal (i.e., cross-connect points 806 of FIG. 8). However, on the main diagonal (806 of FIG. 8), the entries can be either 1 or 0, since a subscriber is mapped to a designated feeder line ($i^{th}$ line to $i^{th}$ line). If the customer does not subscribe to DSL, the subscriber is connected to the feeder line and this entry will be a 1. If the customer subscribes to DSL, the line is connected to a DSLAM port and this entry is a 0. In addition, the sub-matrix Q 710, which connects the subscriber lines 302 to the DSLAM 130, as well as the sub-matrix P 708, which connects the DSLAM 130 to feeder lines 502, are deployed as full matrices.

The decomposition described above with respect to FIGS. 7A and 7B is based on this special matrix structure 702. The first sub-system $732_1$ of the decomposition is formed by the matrices J1 (a copy of sub-matrix J) 706 and the sub-matrix Q 710. Further, the second sub-system $732_2$ is formed by the sub-matrices J2 and P. J1 and J2 are copies of sub-matrix J 706 and they equal are to each other at all times. It is noted that the matrices P and Q are also related, where sub-matrix Q 710 equals to the transpose of sub-matrix P 708 at all times. Accordingly, the decomposition (i.e., decomposed switch 730) is based the special connectivity characteristics of AXC switch 122 in the canonical configuration.

Figure 9:
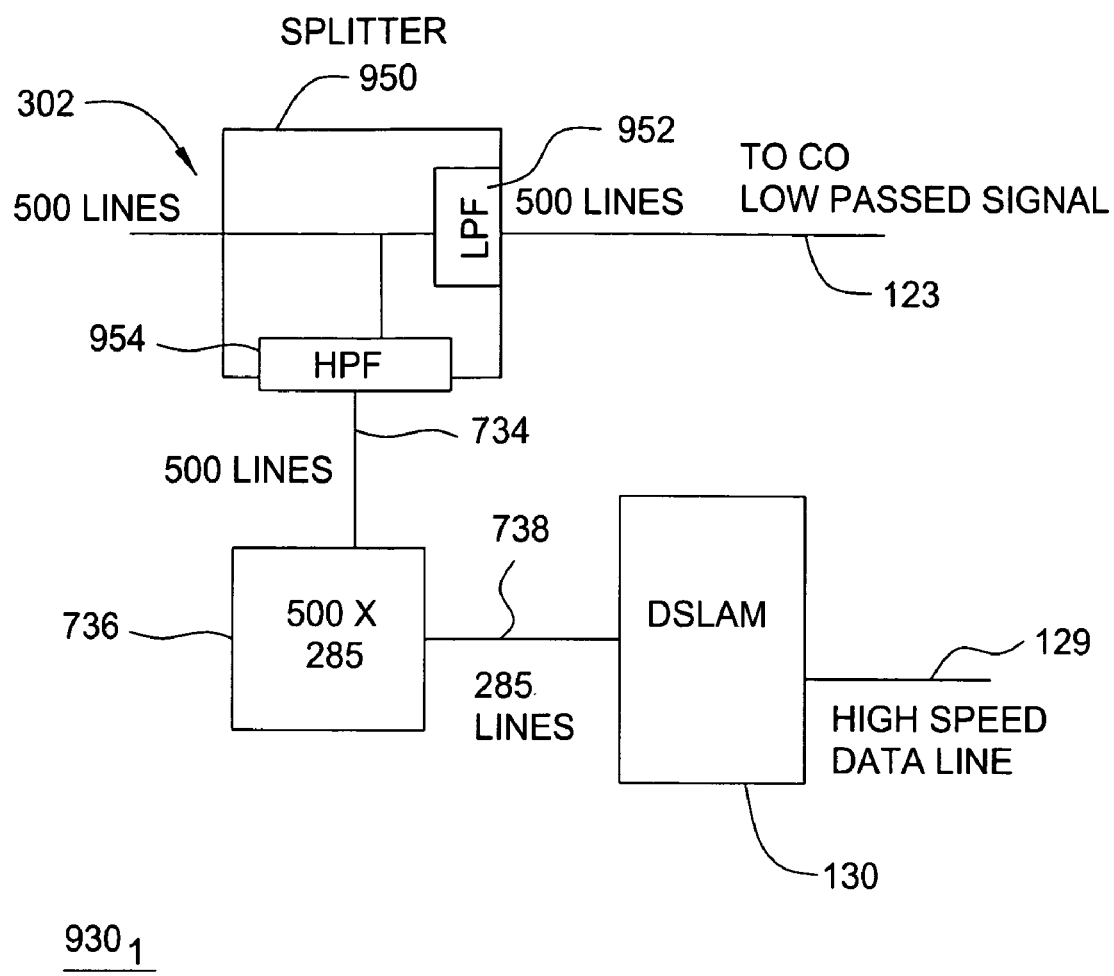
FIG. 9 is a block diagram illustrating decomposition of the exemplary switch of FIG. 5, in accordance with a second embodiment of the present invention.

FIG. 9 is a block diagram illustrating decomposition of the exemplary switch 122 of FIG. 5, in accordance with a second embodiment of the present invention. The second embodiment utilizes a splitter to effectively replace the first diagonal switch $734_1$, as well as the second subsystem $732_2$ in the above decomposition of FIG. 7B to form decomposed switch 930.

In particular, the subscriber lines of a selected group 302 (e.g., 500 subscriber lines) are connected to splitter 950. The splitter 950 comprises a low pass filter (LPF) 952 and a high pass filter (HPF) 954, as discussed above with respect to splitters 110 and 140 of FIG. 1. The splitter 950 is deployed outside of the DSLAM 130, as opposed to being implemented within the DSLAM, as discussed above with respect to FIGS. 5 and 7B.

The splitter 950 dedicates the LPF 952 and the HPF 954 to each subscriber line in the group 302. A low pass signal, which contains the POTS signal from a subscriber premise 102, is forwarded to the CO 160 via the feeder lines 123. A high pass signal, which contains the DSL signal, is forwarded to AXC 736 via one of the lines 734. The AXC switch 736 cross-connects the signal to an unused port at the DSLAM 130. Accordingly, this second embodiment effectively replaces one-half of the system by the splitter 950.

There are several trade-offs between the second decomposition (i.e., with the splitter) and the first decomposition (i.e., with the two subsystems). One consideration is the cost differences between the splitter 950 and an AXC module 732. Specifically, a splitter is much less expensive to purchase and implement than an AXC module. In particular, in many instances, the DSLAM 130 already implements the HPF, while the LPF is already implemented at the Class 5 voice switch 170 at the CO 160. In this case, the splitter merely splits the signal into two branches resulting in lower costs.

Another consideration is that the splitter-based configuration (FIG. 9) does not support unbundling of the copper loop to the competitive local exchange carrier (CLEC). When a CLEC operates a line, the CLEC expects to have both the high-passed and low-passed signal on the same cooper loop, since the CLEC would like to provide both POTS and DSL service to the subscriber using the same line. Consequently, a dispatch is needed to by-pass the splitter in this case. This may be acceptable to some service providers, especially in countries where unbundling is not a legal requirement.

Figure 10:
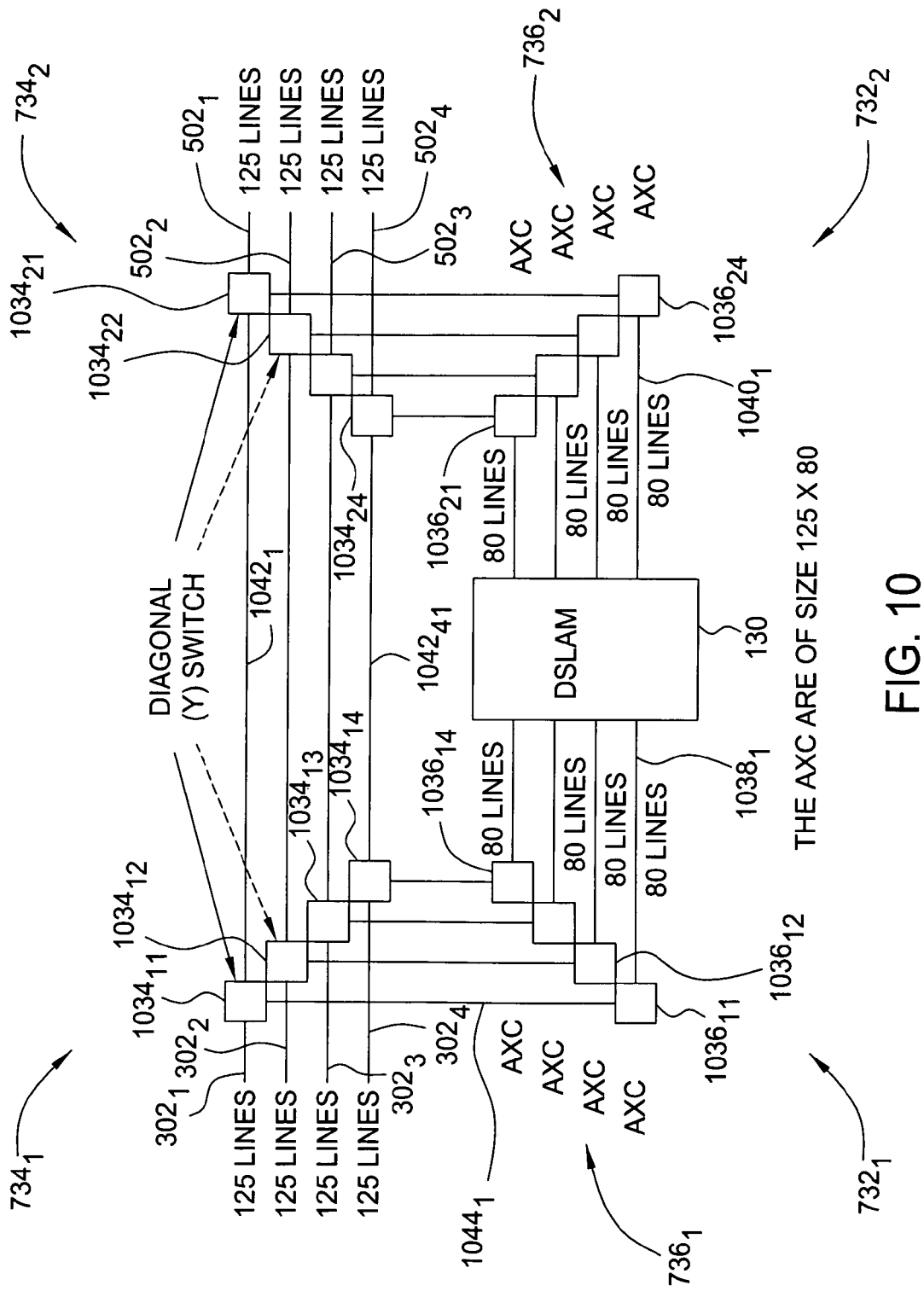
FIG. 10 is block diagram illustrating partitioning of the decomposed switch of FIGS. 7A and 7B in accordance with the principles of the present invention.

FIG. 10 is block diagram illustrating partitioning of the decomposed switch 730 of FIGS. 7A and 7B in accordance with the principles of the present invention. FIG. 10 illustrates that partitioning may also be performed for the decomposed embodiment of a switch to further reduce the size of a decomposed AXC switch, such as the decomposed switch 730 of FIG. 7 and the decomposed switch 930 of FIG. 9. It is noted that the partitioning and decomposing techniques to reduce the size of a switch, as discussed herein, are independent of each other, however both techniques may be performed in any order to further reduce the size of a switch.

Referring to FIG. 7B, each subsystem $732$ (decomposed switch) may be further reduced by partitioning the 500 subscriber lines into four smaller groups of 125 subscriber lines each. Continuing with the current example herein, using a coverage rate of 99% (or a dispatch rate of 1%), each partition should have a dispatch rate 0.25% or a coverage rate of 99.75%. In this example, each partition has a mean average of 62.5 and standard deviation ($\sigma$) of 5.6. Accordingly, a total of 80 DSL ports are required for each partition.

Referring to FIG. 10, the decomposed solution (without the splitter) is partitioned into four partitions. In particular, first sub-system $732_1$ (of FIG. 7B) is partitioned into four diagonal switches $1034_{11}$ through $1034_{14}$. Similarly, the second sub-system $732_2$ is partitioned into four diagonal switches $1034_{21}$ through $1034_{24}$. Each of the diagonal switches $1034$ are all of size 125×125.

The first AXC switch $736_1$ (of FIG. 7B) is partitioned into four AXC modules $1036_{11}$ to $1036_{14}$. Similarly the second AXC switch $736_2$ is partitioned into four AXC modules $1036_{21}$ to $1036_{24}$. Each of the AXC modules $736$ are of size 125×80.

A first group of 125 subscriber lines $302_1$ having high penetration rates (e.g., POTS services) are coupled directly to 125 feeder lines $502_1$ via a line path including diagonal switch $1034_{11}$, line $1042_1$ (which represents connecting 125 lines), and diagonal switch $1034_{21}$, which is coupled to the 125 feeder lines $502_1$. Similar connectivity is provided for the 125 subscriber lines in the second and third subscriber line groups $302_2$ and $302_3$. Finally, the fourth group of 125 subscriber lines $302_4$ also having high penetration rates (e.g., POTS services) are coupled directly to 125 feeder lines $502_4$ via a line path including diagonal switch $1034_{14}$, line $1042_4$ (which also represents connecting 125 lines), and diagonal switch $1034_{24}$, which is coupled to the 125 feeder lines $502_4$.

For DSL services, whether provided on a common access line with POTS services or a separate line, each diagonal switch $1034_{1X}$ associated with the subscriber lines is coupled to a respective AXC module $1036_{1X}$, via a corresponding line $1044_X$ (where x is an integer greater than zero). For example, diagonal switch $1034_{11}$ is coupled to AXC module $1036_{11}$ via line $1044_1$, diagonal switch $1034_{12}$ is coupled to AXC module $1036_{12}$ via line $1044_2$, and so forth. Each line $1044_X$ represents 125 lines from the diagonal switch $1034_{1X}$ to the AXC module $736_{1X}$.

Each AXC module $736_{1X}$ is coupled to the DSLAM $130$ via a respective line connection $1038_X$. Each line connection $1038_X$ represents 80 lines from the AXC module $736_{1X}$ to the DSLAM $130$. A similar arrangement of diagonal switches $1034_{2X}$ and AXC switches $736_{2X}$ are formed for the second sub-system $732_2$.

The total number of cross points for the decomposed partitioned system is 81K for a full matrix, 51K for a 3-stage Clos strictly non-blocking switch, and 31K for a 3-stage Clos rearrangeable switch. This compares to 286K, 92K, and 55K for the non-partitioned non-decomposed solution, and 168K, 71.6K, and 37.2K for the partitioned non-decomposed solution.

That is, for sake of comparison, a partitioned non decomposition configuration using the same parameters as illustrated herein provides four subscriber line groups of 125 lines, each connected to a respective AXC of a size 205×205. For such partitioned non-decomposed configuration, the number of cross-points for each partition is about 42 K for a full matrix, 17.9 K for a 3-stage Clos strictly non-blocking switch, and 9.3 K for a 3-stage Clos rearrangeable switch. Since there are a total of four partitions, the total number of cross-points for the partitioned non-decomposed system is approximately 168 K for a full matrix, 71.6 K for a 3-stage Clos strictly non-blocking switch, and 37.2 K for a 3-stage Clos rearrangeable switch. Thus, the trade-off for a reduction of cross-points is an increase in the number of DSL ports. Alternatively, the number of ports can be the same, but the coverage rate goes down slightly.

Partitioning may also be applied to the case where a splitter is used during decomposition. Referring to FIG. 9, a splitter $950$ was deployed during decomposition in place of the diagonal switch $1134_1$ and the second subsystem $732_2$. The cross-points of this decomposed configuration may be further reduced by the solution shown in FIG. 11.

Figure 11:
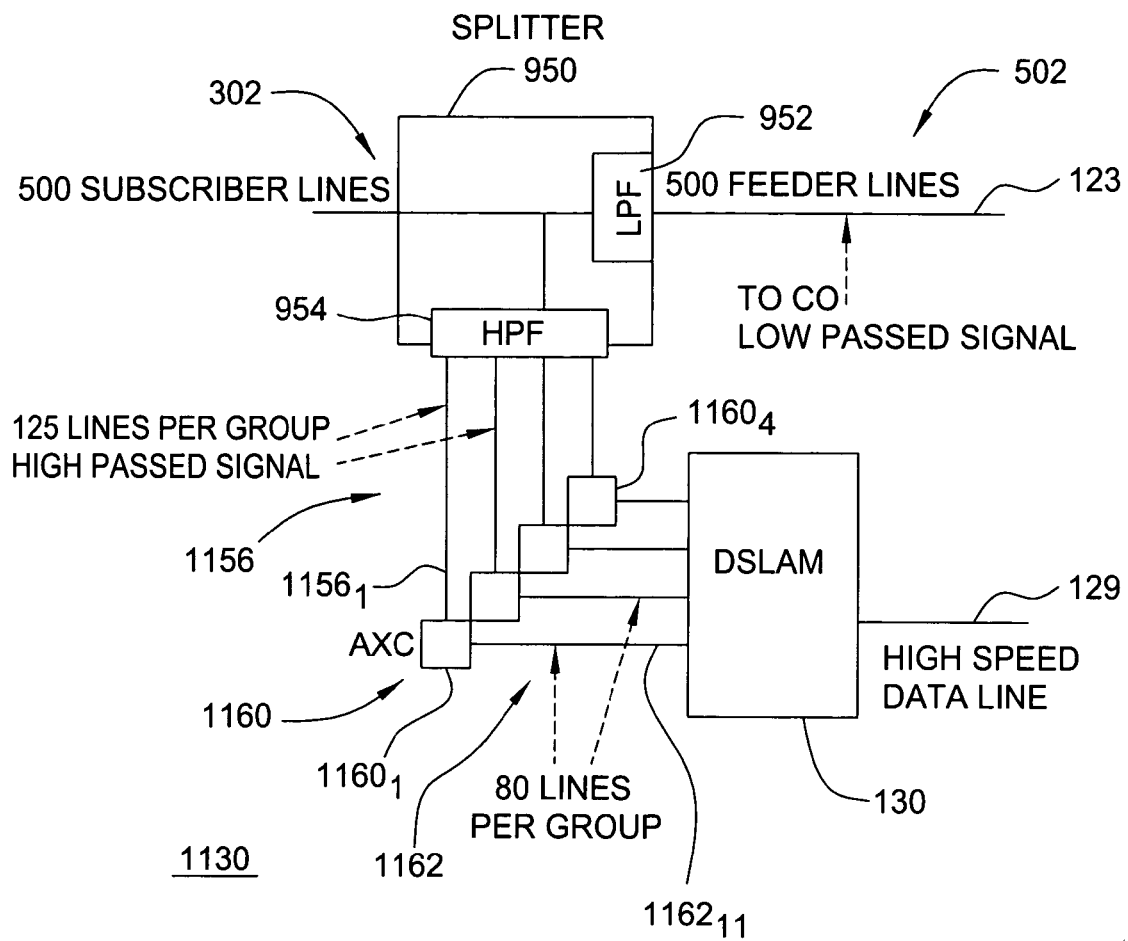
FIG. 11 is block diagram illustrating partitioning of the decomposed switch of FIG. 9 in accordance with the principles of the present invention.

FIG. 11 is block diagram illustrating partitioning of the decomposed switch of FIG. 9 in accordance with the principles of the present invention. Continuing with the same example of 500 subscriber lines, four subscriber lines per subscriber premise, and a single subscriber line used for DSL services per subscriber premise, the exemplary decomposed switch having a size of 500×285 is partitioned into four AXC switches, each having a size of 125×80. The LPF $952$ of the splitter couples low pass signals associated with high penetration POTS services to the 500 subscriber lines in a group $302$ to 500 feeder lines $502$, as discussed above with respect to FIG. 9.

The DSL services are split among the four partitioned AXC modules $1160_1$ through $1160_4$, where each module $1160$ is coupled to the HPF $954$ of the splitter $952$ via a high pass line group $1156$ comprising 125 lines. Each AXC module $1160$ is further coupled to the DSLAM $130$ via a line group $1162$, which comprises 80 lines. For example, HPF $954$ is coupled to AXC module $1160_1$ via line group $1156_1$, and the AXC module $1160_1$ is further coupled to the DSLAM $130$ via line group $1162_1$. The same connectivity pattern is provided for AXC modules $1160_2$ through $1160_4$. The DSLAM provides a high speed data line output $129$ to the packet switched network $150$, as described above with respect to FIG. 1. Thus, either embodiment of the decomposed switch may be further partitioned to reduce the number of cross-points per switch. However, such cross-point reduction comes at the expense of an increased number of DSLAM ports or lowering the coverage rate, as discussed above.

A comparison of all the embodiments of the invention, in terms of number of cross-points, is summarized in the following table. Note there are other factors that may influence the decision. However, number of cross-points is important as it impacts both cost and space of the AXC, critical factors in this application. The numbers shown in TABLE 6 correspond to the exemplary 785×785 AXC in the canonical configuration illustratively discussed herein.

TABLE 6

| Number of cross-points (in thousand) | Full matrix for each module | 3-stage Clos SNB for each module | 3-stage Clos AR for each module |
| --- | --- | --- | --- |
| Canonical (785 × 785) | 616 | 137 | 70 |
| Decomposed | 286 | 92 | 55 |
| Decomposed & Partitioned | 81 | 51 | 31 |
| Filtered | 142.5 | 45.5 | 27 |
| Filtered & partitioned | 40 | 25 | 15 |

Figure 12A:
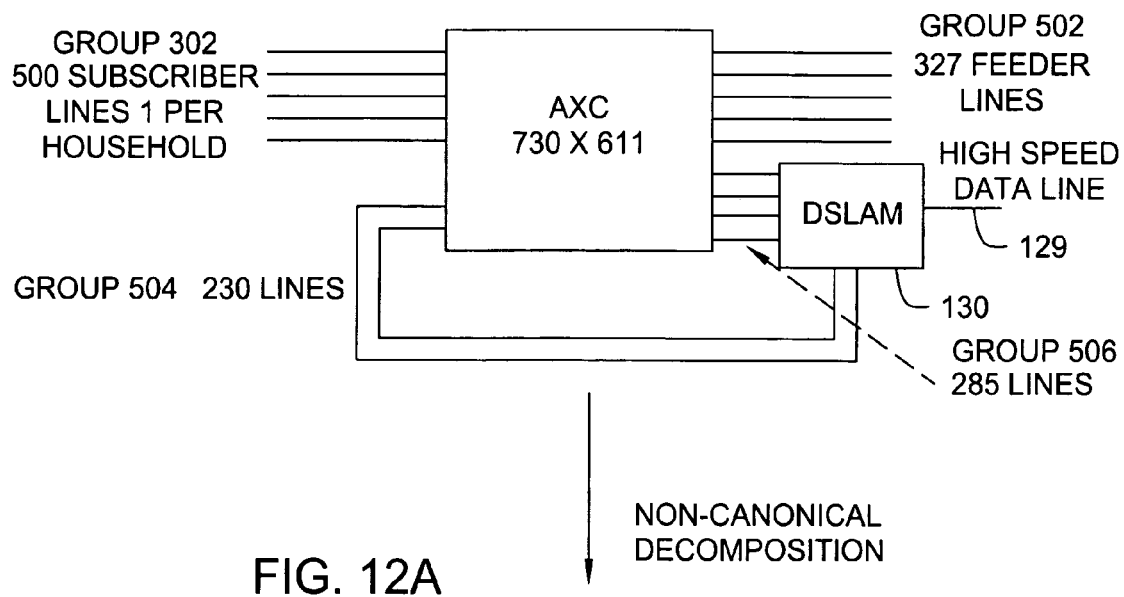
FIGS. 12A and 12B collectively depict a block diagram illustrating decomposition of a non-canonical switch in accordance with a third embodiment of the present invention.
Figure 12B:
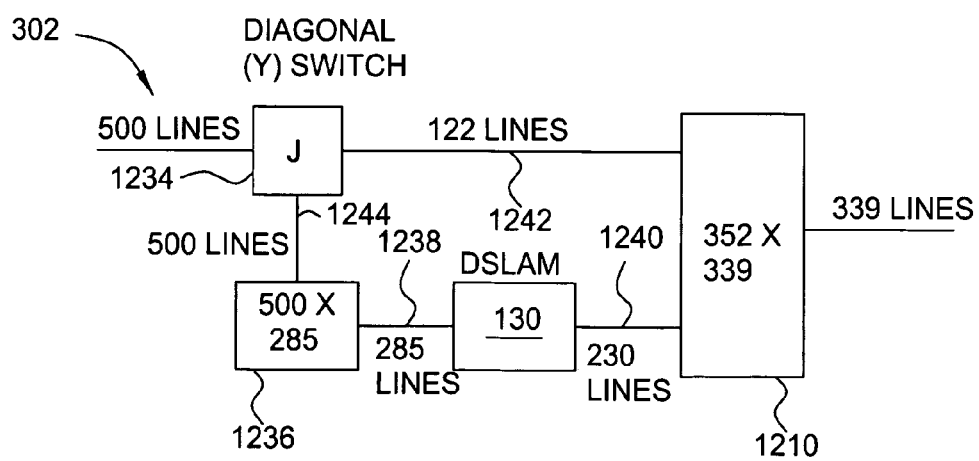

FIGS. 12A and 12B collectively depict a flow diagram illustrating decomposing a non-canonical switch in accordance with a third embodiment of the present invention. As shown in FIG. 12A, to support the DSL service, it is not necessary to have the number of feeder lines connected to the AXC equal the number of subscriber lines connected.

However, when deploying the non-canonical AXC, the service provider first needs to determine the characteristics of the subscriber line group being considered. The SP also needs to determine the penetration rate of POTS, DSL, and the line sharing option. Using the same example as discussed above, let the penetration rate for POTS and DSL is 60% and 50% respectively. Assume that of all the DSL subscribers, 80% of them will use the line sharing option. These assumptions results in the following: 40% of the line supports both the POTS and DSL service (i.e. line sharing option is used), 20% of the line supports only POTS service, 10% of the line supports DSL service only, and 30% of the line is not active (i.e. neither services is subscribed).

Assuming a coverage rate of 99.5%, referring to FIG. 12A, the size of line group 502 is 327 lines, while the size of group 506 is 285 lines. Further, the size of line group 504 would be 230 lines. Therefore, the size of the AXC switch is 730×611.

The connectivity matrix for the non-canonical configuration does not take the simple form as illustrated in FIG. 7B. In particular, the matrix J 706 will not be a diagonal matrix. However, the lower right corner 712 of the matrix is still 0. Therefore, decomposition is still possible, but will be less efficient, and is illustrated in FIG. 12B.

Referring to FIG. 12B, diagonal switch 1234 illustratively receives the exemplary 500 subscriber lines in group 302. A first output of the diagonal switch 1234 is to a first AXC switch 1236 having a size of 500×285. The first output is sent over line group 1244, which is formed by 500 lines, as discussed above with respect to FIG. 7B. An output of the first AXC 1236 is coupled to the DSLAM 130 via line group 1238, which is formed by 285 lines. The DSLAM 130 outputs the DSL signals to a second AXC switch 1210 via line group 1240, which is formed by 230 lines. The second AXC switch 1210 has a size of 352×339. Further, a second output of the diagonal switch 1234 is also coupled to the second AXC switch 1210 via line group 1242, which is formed by 122 lines. Thus, the output of the second switch is 339, which are coupled to the voice switch 170 at the CO 160. It should be appreciated that the size of the switches and the number of lines are provided for illustrative purposes only. For a detailed understanding of how to determine the number of input and output lines at each AXC, the reader is directed to U.S. patent application Ser. No. 19/954,962, filed Sep. 30, 2004.

In general, the deployment of the canonical configuration is simpler than the non-canonical configuration and has an efficient decomposition. However, the use of the non-canonical form may be advantageous in instances where there are severe limitations of the feeder lines at the remote hub, since the non-canonical configuration uses less feeder lines, or the penetration of the line sharing option is low.

It is noted that the canonical configuration is based on the assumption that at most one DSL line is provided per household. Additionally, it is assumed that the lines are modeled after the $1^{st}$ line of a household, where the penetration rates of the POTS and the line sharing option are high.

The connectivity of the canonical configuration has some special characteristics. Based on these characteristics, this invention specifies a method that the AXC at the remote hub can be decomposed into two subsystems. The decomposed system has fewer cross-points than the original system, and thereby has lower cost and requires less space. Both are critical in the remote hub application. It is envisioned that the present invention applies as AXC switch implementations.

In another embodiment of the invention, one of the subsystems is replaced by a splitter, further reducing the number of cross-points needed. The trade-off between the two embodiments is cost of the splitter versus the cost of an AXC. In addition, the splitter-based solution does not support unbundling of the copper loop to the CLEC. However, dispatches are necessary to accommodate CLEC provisioning.

The method of partitioning may be performed in conjunction with both canonical and non-canonical embodiments by reducing the number of cross-points further. However, partitioning comes at the expense of more DSLAM ports or lower coverage rate.

Although the invention is described though the remote hub application, the same principle can be applied to analog cross-connect application at other locations such as a central office, a basement of a high-rise building, among other sites.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof.

What is claimed is:

1. An apparatus for providing connectivity at a hub having a plurality of subscriber lines and a plurality of feeder lines, comprising:

a first switch module for coupling to N of said plurality of subscriber lines, where N is an integer, and for coupling to a digital subscriber line access multiplexer (DSLAM) at said hub, wherein said first switch module comprises a first automatic cross-connect (AXC) switch; and a second switch module coupled to said first switch module and said DSLAM, said second switch module adapted for coupling to M of said plurality of feeder lines at said hub, where M is an integer, wherein said second switch module comprises a second automatic cross-connect (AXC) switch.

2. The apparatus of claim 1, wherein said first switch module further comprises at least one first diagonal switch coupled to said N subscriber lines wherein said first AXC switch coupled to said at least one first diagonal switch via N first lines.

3. The apparatus of claim 2, wherein said first AXC switch is coupled to said DSLAM via P second lines, where P is an integer.

4. The apparatus of claim 3, wherein said second switch module is coupled to said first switch module via Q third lines, where Q is an integer.

5. The apparatus of claim 4, wherein said second switch module is coupled to said DSLAM via R fourth lines, where R is an integer.

6. The apparatus of claim 5, wherein N, M, P, Q, and R have different values.

7. The apparatus of claim 5, wherein said second switch module further comprises at least one second diagonal switch coupled to said M feeder lines, wherein said second AXC switch coupled to said at least one second diagonal switch via N fifth lines.

8. The apparatus of claim 7, wherein N, Q, and M are equal quantities.

9. The apparatus of claim 7, wherein P and R are equal quantities.

10. The apparatus of claim 7, wherein said at least one first and said at least one second AXC switches are partitioned.

11. The apparatus of claim 1, wherein said first and second AXC switches are switches selected from the group consisting of a full matrix switch and a Clos switch.

* * * * *